Patented Jan. 2, 1951

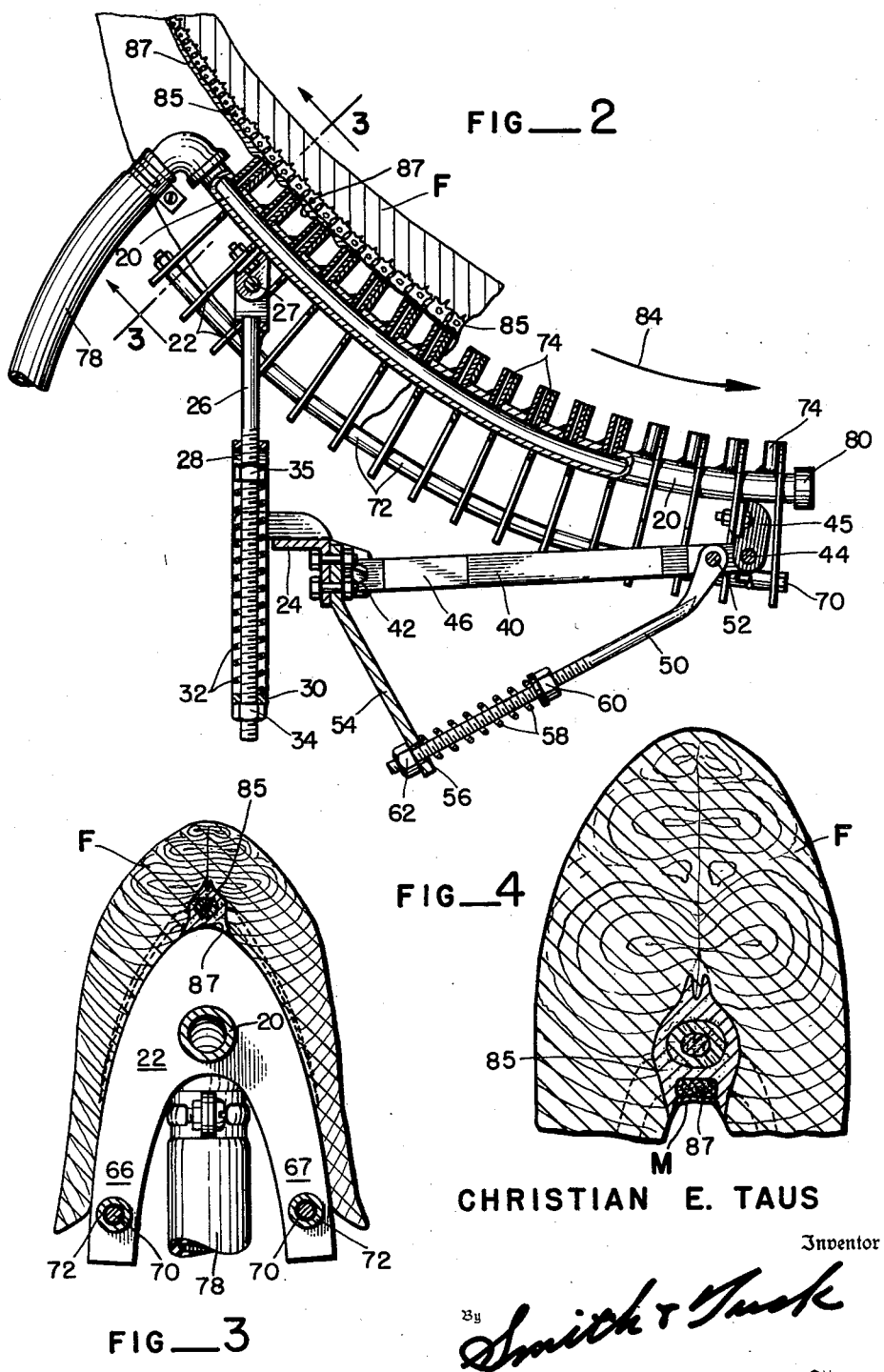

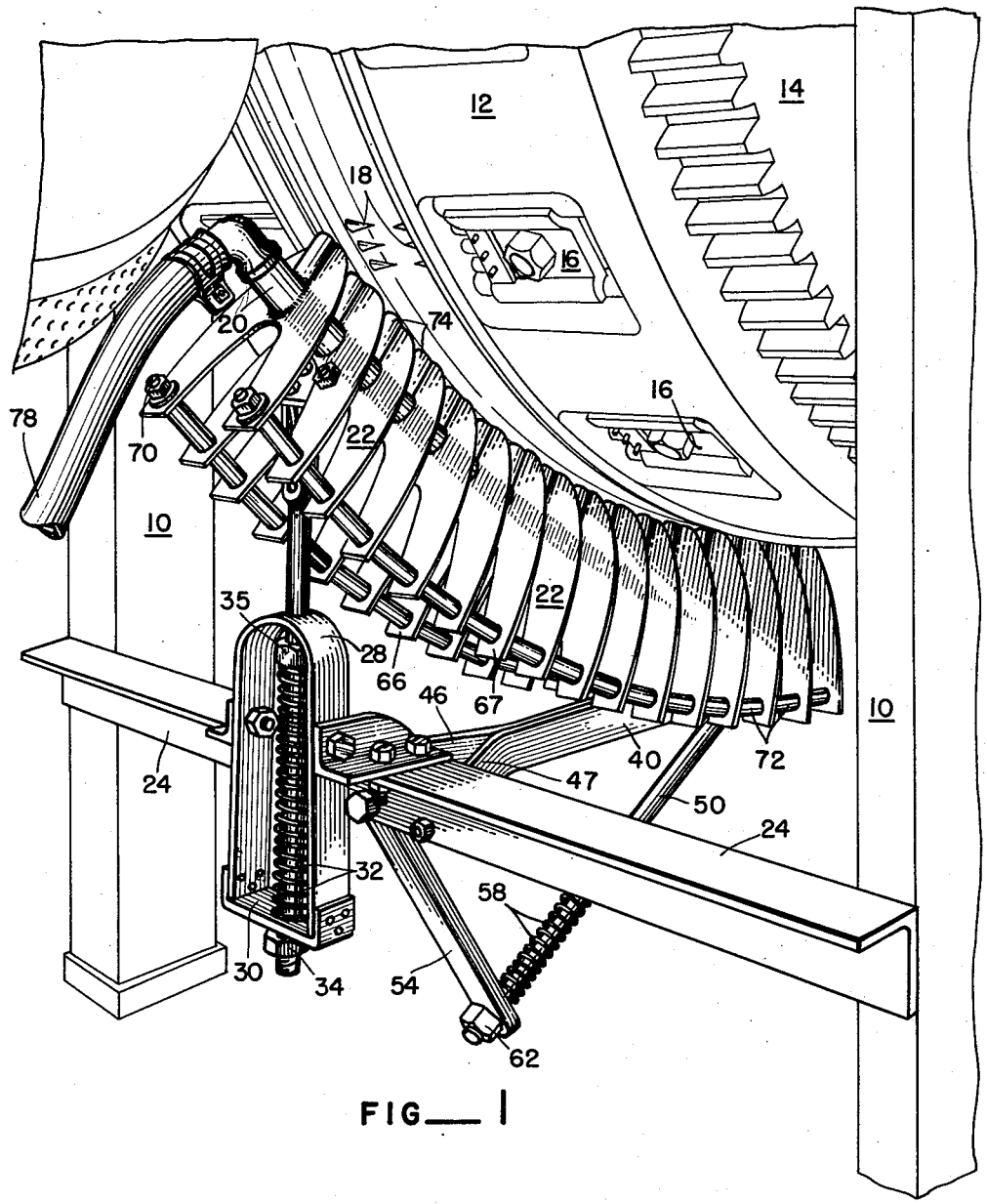

2,536,826

UNITED STATES PATENT OFFICE 2,536,826

DEVICE FOR WASHING AND SCRAPING THE INSIDE OF FISH

Christian E. Taus, Snohomish, Wash.

Application March 29, 1948, Serial No. 17,728

7 Claims. (Cl. 17—3)

My present invention relates to the general class of fish cleaning devices and, more particularly, to a device for washing and scraping the inside of fish.

My present device is designed as an attachment for use with a particular type of fish cleaning machine. This fish cleaner, which has been developed over a long period of time for use particularly in the salmon industry, is shown in its original development in the two patents to E. A. Smith Nos. 998,129 and 1,034,525. Since the early date of these patents many attempts have been made to improve the workability of these machines, and these various devices have as a rule added to the degree of cleaning provided by the basic machine. However, it has been the experience in the industry that it is still necessary, that, in addition to the machine, a considerable number of persons be employed to finish the cleaning operation. This work is expensive; first, in cost of labor and space required, and secondly, it slows the speed of operation which, with existing equipment, can be achieved at a high rate of speed if there are no delays in the line.

My equipment is not intended to displace any of the normal cleaning elements of the rotary type fish cleaner. By that is meant the type where the fish is engaged and impaled on a revolvable wheel and as it passes around the same it is acted upon by various knives, saws, and brushes so that its head, tail, fins, and entrails are removed. My device is placed at the end of these operations so that it takes care of the cleaning not otherwise achieved by the normal functioning of these highly developed machines.

It has been found that the most difficult of all the cleaning operations is to clean the entrail cavity of the fish adjacent the backbone. Here, because of physiological reactions, the sac which lies parallel to the backbone of the fish becomes filled, on the fish's death, with clotted blood which is covered by a membrane which tends to stiffen and strengthen as the fish tends to dehydrate after death. I am fully aware that many devices have been designed to clean this very portion of the fish. However, it is believed that the principal fault of these devices in the past has been the attempt to clean the fish without sufficient softening of the tissues by water prior to applying the final scraping or brushing action.

In my present device I provide a plurality of scrapers each followed, as it contacts the fish, with a water nozzle which directs water against the membrane and clotted blood of the sac and softens it, so that the scraper following immediately thereafter can dislodge the blood clot thus loosened.

Further, my whole device is mounted so that it is resilient in two directions, both in the plane of the fish carrying wheel, so that the scrapers can be forced into the depressions occurring between each joint of the fish's backbone.

The principal object of my present invention, therefore, is to provide a cleaning device for rotary drum fish cleaners wherein a jet of water is directed into the spot to be cleaned and immediately followed by a resiliently mounted scraper.

A further object of my present invention is to provide a plurality of scraping devices with the whole assembly resiliently mounted and each individual scraper immediately preceded and followed by a jet of water.

A further object of my invention is to provide a fish cleaning attachment for rotary drum fish cleaners which is characterized by simplicity of construction and mounting so that it can be maintained under operating conditions for long periods of time.

Further objects, advantages and capabilities will be apparent from the description and disclosure in the drawings or may be comprehended or are inherent in the device.

In the drawings:

Fig. 1 is a perspective view showing my device and illustrating how it is attached to a standard rotary-drum type of fish cleaner.

Fig. 2 is a vertical sectional view taken along the plane in which the fish is carried during the cleaning operation.

Fig. 3 is a cross-sectional view taken along the line 3—3 of Fig. 2.

Fig. 4 is an enlarged portion of Fig. 3, shown in section.

Referring more particularly to the disclosure in the drawings, the numeral 10 designates generally the supporting frame for a rotary drum type of fish cleaner. This framework supports the rotary drum 12 which is usually supported on a plurality of rollers which engage the drum near its periphery and the drive is provided by the large gear 14, which is driven by some suitable drive means. Disposed entirely around the periphery of drum 12 is a plurality of engagement members 16, each of which is provided with a plurality of pointed pins 18, which act as skewers to engage the back of the fish and hold it in position throughout the sequence of the cleaning operations. These pins are normally operated by grooved cam-means so that they will at proper times engage and disengage fish. These elements however, with variations that have been introduced in the art over a long period of time, form no part of this present invention. My invention consists of a special cleaning device which has as its purpose the cleaning of the blood sac found adjacent to the backbone of a fish, and it is intended that my device will supplement the various cleaning arrangements of the fish cleaner and perform its one specific purpose at the end of the fish cleaning cycle.

The main frame element of my device is the curved water-supply pipe 20. This pipe is given a curve just slightly greater in radius that the radius followed by the fish's backbone as it is passed around the cleaning drum. Further I prefer, for best operation, that this tube or pipe 20 be mounted so that its center of curvature does not coincide with the center of the drum. In this way it is possible to introduce the fish into the V-shaped opening thus provided between my device and the drum, and then, as the fish progresses along through this V-shaped arrangement, it will encounter successively increased pressure from the various scraping plates 22. My device is mounted upon a cross-frame member 24 which, in turn, is fixedly secured to the upwardly disposed frame member portions of the main frame 10.

Referring to Figs. 1 and 2, it will be noted that the leading or upper end of my device is mounted for vertical movement only. This is achieved by having rod 26 pivoted at 27 to the upper end of my scraper assembly, and then to have rod 26 extend downwardly through spaced guides, as the U-shaped member 28, and the bottom plate binding member 30. A compression spring 32 is employed normally positioned to urge my device upwardly. This upward urgence, however, which positions the device initially, is limited in its upward movement by the adjustable nut 34, and the tension of spring 32 is adjustable by means of the positioning of nut 35. It therefore follows that the upper or left-hand end of my device, as viewed in Figs. 1 and 2, is capable of vertical movement. The extreme upper position is limited; yet by virtue of being pivoted on bolt 27, my whole device can pivot about bolt 27 and assume positions that will vary the V-shaped opening between my device and the main drum 12.

The lower end, or the right-hand end, as viewed in Figs. 1 and 2, of my device is supported and is adjusted and resiliently positioned by means of the supporting strut 40 which is pivotally mounted at 42, and pivotally secured at its opposite or trailing end at 44, through a bracket 45, which in turn is fixedly secured to my device.

In order to give lateral stability to strut 40 I normally prefer to form it of two pieces, as will be best observed in Fig. 1, in which two angularly disposed end members 46 and 47 make it possible to have pivots 42 separated from each other sufficiently to give a marked degree of lateral stability.

The outer end of strut 40 is supported by rod 50. Rod 50 is deformed and pierced for the pivot pin 52 which passes through strut 40. At its lower end, rod 50 passes through a downwardly extending bracket member 54, which is fixedly secured as to frame member 24 and through which rod 50 passes, as at 56. A compression spring 58 encircles rod 50, and a tensioning nut 60 is provided, so that considerable compression can be applied thereto. The compression of spring 58, it will be observed, especially in Fig. 2, actually positions the lower end of my cleaning device with respect to the bull wheel 12. This positioning, however is resilient due to the spring action of spring 58, and thus the exact positioning of the scrapers is subject to adjustment, which will vary with the displacement caused by the fish as it passes between the rotary drum or bull wheel and my cleaning device. In order to limit the upward movement of rod 50 and its associated parts, I provide the nut 62 whose position will of course determine that upward limit.

Referring to Figs. 1, 2, and 3, it will be noted that, disposed upon pipe 20, are a plurality of scraper plates 22. These plates are fixedly secured to pipe 20, as by welding thereto, or by any other convenient means, and are held further in spaced relationship. The lower portions of scrapers 22, which it will be noted particularly in Fig. 3, are bifurcated so as to provide the two legs as 66 and 67. Each leg 66, 67 has an opening and a rod 70 runs through the openings in legs 66 and another runs through the openings in legs 67. Individual spacing members 72 are positioned on rods 70 and between adjacent plates 22. Nuts are provided at either end of rod 70 outside of the end plates 22. These spacers are usually pieces of pipe or tubing.

There are two reasons for having the two legs 66, 67, formed in scrapers 22 rather than to employ a solid plate. First, the relief thus provided gives sufficient room for the free swing of my device with respect to rod 26 and strut 40 and its associated parts. Most important, however, it is believed that the relief of the plates by the U-shaped opening provided by the two legs 66, 67, make it possible for the refuse which has been stripped out of the fish's internal cavity to drop free and not pile up on the sides of the plates. This permits most easy visual inspection and also permits the use of steam hoses, and the like, if the same become necessary for thorough cleaning. The factor of cleaning devices of this order which are, in themselves, somewhat complicated to clean, is of great importance when it is realized that this type of equipment is used only for the cleaning of food fishes.

Theory originally prompted the design which practical experience has proved to be so essential; that is namely, the provision of a water nozzle 74, one for each scraper plate 22, disposed immediately in rear of these plates. While not absolutely essential, I have found it most satisfactory to secure nozzle 74 directly to the rear face of plate 22. In this way a jet of water is applied to the material just as it is being attacked by the scraper itself. This adds very materially to the effectiveness in removing the clotted blood from the backbone sac of the fish. Experience has shown, however, that it is not within the realm of the achievable to have a single scraper which will effectively clean the inside of a fish, and only by employing a series of such nozzles and scrapers can the assurance of perfect cleaning be achieved. Experience shows that normally the average fish will be cleaned when passed over half the number of scrapers shown. However, a single fish may have dried out more than the others or a group of fish that were stored under less favorable conditions may require substantially all of the scrapers and nozzles, and it is thus found necessary to provide enough of these elements so that the cleaning can be depended upon as being complete, otherwise it is necessary to still provide the sliming tanks and operating personnel therefor.

The vertebral section each form a relatively deep, bone walled recess in which the blood coagulates. This blood thus forms, beneath the membrane M lining the fish cavity, a continuous blood sac 87, showing a smooth outer surface but of greater depth where the vertebral recesses occur. The cleaning of such a blood sac is readily effected by my device as scrapers 22 break the covering membrane, scrape away a portion of the coagulated blood, and the nozzle 74 following immediately behind the scraper flushes away all the loosened blood and softens it for the next scraper and nozzle over which the fish passes. This general operation is carried out by each of the scraper and nozzle units making up my device. Ordinarily a portion of the units is sufficient to thoroughly clean the blood sac; however, to make certain of the complete cleaning under most adverse conditions an excess of units is desirable.

In using my device, water is supplied under considerable pressure through hose 78, and as pipe 20 is sealed by cap 80, it has been found that considerable pressure can be applied to each of the various nozzles 74, and in this way a stream of water of relatively high velocity can be projected into the clotted blood. This will hit the blood sac normally after one or more previous scrapers have passed over the same, and the stream thus applied is working under most favorable conditions so that the scraper to which the nozzle is attached will be itself operating under optimum conditions. With the supporting arrangement previously described, fish F will be subjected normally to increasing pressure from scrapers 22, as it progresses through the machine following the direction of arrow 84. When this is achieved, the depressions that may be felt on the inside of the fish due to the various vertebrae sections 85, can be definitely reached into by the scrapers and the water jet, and thus the blood sac, which has been indicated in Fig. 3 at 87, can be entirely removed together with the membrane that normally covers the same and the fish will be completely cleaned ready for further processing.

It is believed that it will be clearly apparent from the above description and the disclosure in the drawings that the invention comprehends a novel construction of a device for washing and scraping the inside of fish.

Having described my invention, I claim:

1. A cleaning attachment for rotary-drum fish cleaners consisting of: a water supply pipe curved on a radius greater than the outside radius of the drum with which it is used; a plurality of scrapers disposed transversely of and substantially equi-distant and closely spaced along said pipe, said scrapers being shaped to conform to the cross-section of the internal cavity of a fish and bifurcated to provide downwardly directed side scraping members; a plurality of upwardly directed water nozzles communicating with said pipe disposed one on each of said scrapers; a resiliently supported vertical rod, pivoted to the leading end of said attachment and adapted to yieldably support the leading end of said attachment; a strut having a fixed pivot at one end and pivotably secured to said attachment at its trailing end; a second angularity positioned, resiliently supported rod adapted to yieldably support the trailing end of said attachment; adjustable means adapted to limit the upward movement of said rods and form a V shaped opening between said scrapers and the drum of the fish cleaner, and means to supply water under pressure to said pipe.

2. A cleaning attachment for rotary-drum fish cleaners consisting of: a water supply pipe curved on a radius greater than the outside radius of the drum with which it is used; a plurality of scrapers disposed transversely of and substantially equi-distant and closely spaced along said pipe, said scrapers being shaped to conform to the cross-section of the internal cavity of a fish; a plurality of upwardly directed water nozzles communicating with said pipe disposed one on each of said scrapers; a resiliently supported rod, pivoted to the leading end of said attachment and adapted to yieldably support the leading end of said attachment; a strut having a fixed pivot at one end and pivotably secured to said attachment at its trailing end; a second resiliently supported strut adapted to yieldably support the trailing end of said attachment; adjustable means adapted to limit the upward movement of said rod and strut to form V shaped fish receiving opening between the said scrapers and the drum of the fish cleaner, and means to supply water under pressure to said pipe.

3. A cleaning attachment for rotary-drum fish cleaners consisting of: a water supply pipe curved on a radius greater than the outside radius of the drum with which it is used; a plurality of scrapers disposed transversely of and substantially equi-distant and closely spaced along said pipe, said scrapers being shaped to conform to the cross-section of the internal cavity of a fish and bifurcated to provide downwardly directed side scraping members; a plurality of upwardly directed water nozzles communicating with said pipe disposed one on each of said scrapers; means for resiliently supporting the leading end of said attachment; a strut having a fixed pivot at one end and pivotably secured to said attachment at its trailing end; a second angularity positioned, resiliently supported rod adapted to yieldably support the trailing end of said attachment; adjustable means adapted to limit the upward movement of said rods and means to supply water under pressure to said pipe.

4. A cleaning attachment for rotary-drum fish cleaners consisting of: a water supply pipe curved on a radius substantially equal to the radius of the drum with which it is used; a plurality of scrapers disposed transversely of and substantially equi-distant and closely spaced along said pipe, said scrapers being shaped to conform to the cross-section of the internal cavity of a fish; a plurality of upwardly directed water nozzles communicating with said pipe disposed one on each of said scrapers; means adapted to yieldably support the leading end of said attachment; a strut having a fixed pivot at one end and pivotably secured to said attachment adapted to give transverse and longitudinal stability to said attachment; means adapted to yieldably support the trailing end of said attachment; and means to supply water under pressure to said pipe.

5. For use in connection with a rotary-drum fish cleaning machine of the type wherein a fish is carried in a curved path with the visceral cavity outward, a cleaner mechanism, comprising: a series of nozzles arranged in fixed relation to each other and mounted so that the discharge ends thereof lie aligned in an arc contiguous with the path of fish carried on said drum, a scraper plate positioned adjacent and secured to the discharge end of each said nozzle and having a wing extension laterally and outwardly extending on each side, and means for supplying water under pressure to said nozzles.

6. For use in connection with a rotary-drum fish cleaning machine of the type wherein a fish is carried in a curved path with the visceral cavity outward, a cleaner mechanism, comprising: a series of nozzles arranged in fixed relation to each other and mounted so that the discharge ends thereof lie aligned in an arc contiguous with the path of fish carried on said drum, a scraper blade positioned in following relation adjacent and secured to the discharge end of each said nozzle and having a wing extension laterally and outwardly extending on each side, and means for supplying water under pressure to said nozzles.

7. For use in connection with a rotary-drum fish cleaning machine of the type wherein a fish is carried in a curved path with the visceral cavity outward, a cleaner mechanism, comprising: a series of nozzles arranged in fixed relation to each other and mounted so that the discharge ends thereof lie aligned in an arc slightly eccentric with the path of fish carried on said drum, a scraper blade positioned adjacent the discharge end of each said nozzle and having a wing extension laterally and outwardly extending on each side, rockable resilient means for supporting said nozzles and scraper blades, and means for supplying water under pressure to said nozzles.

CHRISTIAN E. TAUS.

REFERENCES CITED

The following references are of record in the file of this patent:

UNITED STATES PATENTS

| Number | Name | Date |
|---|---|---|
| 1,119,104 | Mohr | Dec. 1, 1914 |
| 1,322,740 | Waugh | Nov. 25, 1919 |